United States Patent
Lin et al.

(10) Patent No.: US 9,077,095 B2
(45) Date of Patent: Jul. 7, 2015

(54) INSERTION DEVICE HAVING RECOVERING MECHANISM

(71) Applicant: JARLLYTEC CO., LTD., New Taipei (TW)

(72) Inventors: Chia-Han Lin, New Taipei (TW); Meng-Jen Pan, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 93 days.

(21) Appl. No.: 13/766,623

(22) Filed: Feb. 13, 2013

(65) Prior Publication Data

US 2013/0259564 A1    Oct. 3, 2013

(30) Foreign Application Priority Data

Mar. 30, 2012   (TW) .............. 101111606 A (51) Int. Cl.
*G12B 9/00* (2006.01)
*H01R 13/42* (2006.01)
*G06F 1/16* (2006.01)

(52) U.S. Cl.
CPC ............. *H01R 13/42* (2013.01); *Y10T 403/602* (2015.01); *G06F 1/1632* (2013.01); *G06F 1/1654* (2013.01); *G06F 1/1679* (2013.01)

(58) Field of Classification Search
CPC ..... H01R 13/42; G06F 1/1654; G06F 1/1679; G06F 1/1632
USPC .......... 248/222.11, 27.1, 27.3, 298.1, 220.21, 248/221.11, 223.31, 225.21; 403/327; 361/679.58, 679.26, 679.27; 292/45, 292/251.5
See application file for complete search history.

(56) References Cited

U.S. PATENT DOCUMENTS

| | | | |
|---|---|---|---|
| 6,517,129 B1 * | 2/2003 | Chien et al. ................. | 292/251.5 |
| 6,927,972 B1 * | 8/2005 | Wang et al. .............. | 361/679.55 |
| 7,405,927 B2 * | 7/2008 | Lev ........................... | 361/679.55 |
| 7,637,540 B2 * | 12/2009 | Chiang ......................... | 292/45 |
| 7,997,631 B2 * | 8/2011 | Chen ......................... | 292/251.5 |
| 8,009,424 B2 * | 8/2011 | Zhu et al. ................. | 361/679.58 |
| 2011/0026197 A1 * | 2/2011 | Zhao et al. ............... | 361/679.01 |

FOREIGN PATENT DOCUMENTS

TW        M419964        1/2012

* cited by examiner

*Primary Examiner* — Anita M King
(74) *Attorney, Agent, or Firm* — Guice Patents PLLC (57) ABSTRACT

The present invention relates to an insertion device having recovering mechanism, which comprises: a support formed with an accommodation hole; a sliding rod capable of being elastically moved relative to the support; and a recovering mechanism. The recovering mechanism is installed with a spring accommodated in the accommodation hole, an actuation unit disposed above the spring, and the bottom of the actuation unit is formed with a stop plate, the spring enables the actuation unit to be moved upwardly/downwardly thereby enabling the stop plate to stop the sliding rod at a first position or release the sliding rod at a second position. Accordingly, the recovering mechanism is suitable to be installed in a smaller space.

5 Claims, 11 Drawing Sheets

INSERTION DEVICE HAVING RECOVERING MECHANISM

BACKGROUND OF THE INVENTION

1. Field of the Invention

The present invention relates to an insertion device, especially to an insertion device having recovering mechanism capable of allowing an electronic device to be inserted and connected with an expansion base.

2. Description of Related Art

The tablet computer is a portable personal computer which is easy to be carried around and simple in operation, the adopted input method is to utilize a virtual keyboard or hand writing identification system installed on a touch screen, thereby saving the installation of a solid keyboard and mouse.

However, for users who have already used the desktop computer or notebook computer for a long period of time, a solid keyboard is still a preferable way for inputting, so an expansion base installed with a solid keyboard and capable of allowing a tablet computer to be connected with is developed. The tablet computer is able to be inserted in the insertion device fastened on the expansion base, thereby integrally combining with the expansion base, and forming a notebook computer like state which allows relatively rotation for folding/unfolding.

A conventional insertion device such as the "Inserting/pulling type joining structure" disclosed in the Taiwan Publication NO. M419964 includes: a main seat fasten on an expansion base; a linkage rod capable of being moved in parallel relative to the main seat, and having an engaging part being engaged with a display panel; and an elastic unit respectively connected to the main seat and the linkage rod, thereby allowing the engaging part to be moved between a first position for being engaged with the display panel and a second position for being released from the display panel. The main seat includes a recovering mechanism allowing the display panel to be pressed thereon, the recovering mechanism includes an abutting part and a top pressing part connected with the abutting part, and the linkage rod includes a stop plate abutted against the abutting part at the first position and abutted against the top pressing part at the second position.

The recovering mechanism is rotated through a torsion spring thereby enabling the stop plate of the linkage rod to be abutted against the abutting part or the top pressing part. However, the mechanism disclosed above occupied a considerable amount of space, when the space for installing the recovering mechanism is reduced, the recovering mechanism is not suitable to be adopted.

SUMMARY OF THE INVENTION

One primary objective of the present invention is to provide an insertion device having recovering mechanism, the recovering mechanism utilizes an actuation unit capable of being elastically upwardly/downwardly moved for stopping or releasing a sliding rod, thereby being suitable to be installed in a smaller space and increasing the application range.

For achieving the above-mentioned objective, one solution of the present invention is to provide an insertion device having recovering mechanism, which comprises:

a support, formed with an accommodation hole;

a sliding rod, formed with at least one buckle part, capable of being moved in parallel relative to the support;

an elastic unit, two ends thereof respectively connected to the support and the sliding rod; and a recovering mechanism, installed with a spring accommodated in the accommodation hole, an actuation unit disposed in an installation slot of the support, the top of the actuation unit is formed with a press connection part disposed above the spring, and the actuation unit is formed with a stop plate, the spring enables the actuation unit to be moved thereby enabling the stop plate to stop the sliding rod at a first position or release the sliding rod at a second position.

Another solution of the present invention is to provide an insertion device having recovering mechanism, which comprises:

a support, formed with an accommodation hole;

a sliding rod, formed with at least one buckle part, capable of being moved in parallel relative to the support;

an elastic unit, two ends thereof respectively connected to the support and the sliding rod; and a recovering mechanism, installed with a spring accommodated in the accommodation hole, an actuation unit penetrated the accommodation hole, and a spring sleeved on the actuation unit, the top of the actuation unit is formed with a press connection part disposed above the spring, and the actuation unit is formed with a stop plate, the spring enables the actuation unit to be moved thereby enabling the stop plate to stop the sliding rod at a first position or release the sliding rod at a second position.

According to one embodiment of the present invention, the accommodation hole is longitudinally formed, and the spring is a compress spring, the actuation unit is formed as a press rod penetrated the accommodation hole, the bottom thereof is passed the accommodation hole and sleeved with the stop plate, the stop plate is disposed below the support, the sliding rod is formed with an abutting part; when being at the first position, the abutting part is stopped by the stop plate, when being at the second position, a movement space is formed between the stop plate and the bottom of the support, the abutting part is released thereby being allowed to enter the movement space.

According to another embodiment of the present invention, the accommodation hole is formed at the bottom of the support, the top of the accommodation hole is formed with a through hole, the actuation unit is formed as a rod member, the top of the rod member is formed as the press connection part, the press connection part is passed the through hole of the support and protrudingly disposed on the support, the stop plate is formed at the middle of the rod member, and the spring is sleeved at the bottom of the rod member.

When the present invention is applied in a tablet computer and an expansion base thereof, the support is fastened on the expansion base, when the tablet computer is not inserted and connected with the expansion base, the spring is in a released state, the actuation unit is at the first position, the stop plate of the actuation unit is served to stop the sliding rod and the elastic unit is in a stretched state.

When the tablet computer is desired to be inserted and connected with the expansion base, the tablet computer is downwardly inserted in the insertion device, so the bottom of the tablet computer downwardly presses the actuation unit, thereby compressing the spring in the accommodation hole, and the actuation unit is downwardly moved to the second position, at this moment, the stop plate of the actuation unit releases the sliding rod, the sliding rod is pulled by the recovering force provided by the elastic unit thereby enabling the at least one buckle part to be moved and buckled in a combination hole formed at the bottom of the tablet computer thereby forming a fastened state.

When the tablet computer is desired to be removed, the sliding rod is pushed, so the elastic unit is stretched, the sliding rod and the at least one buckle part thereof are moved and separated from the buckle location formed in the combination hole at the bottom of the tablet computer, thereby enabling the tablet computer to be upwardly removed. After the tablet computer is removed, the actuation unit is recovered to the original first position through the spring, and the sliding rod is stopped by the stop plate, thereby allowing the sliding rod and the at least one buckle part to be recovered to the original positions, the tablet computer is then facilitated to be inserted again for being connected with the expansion base.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
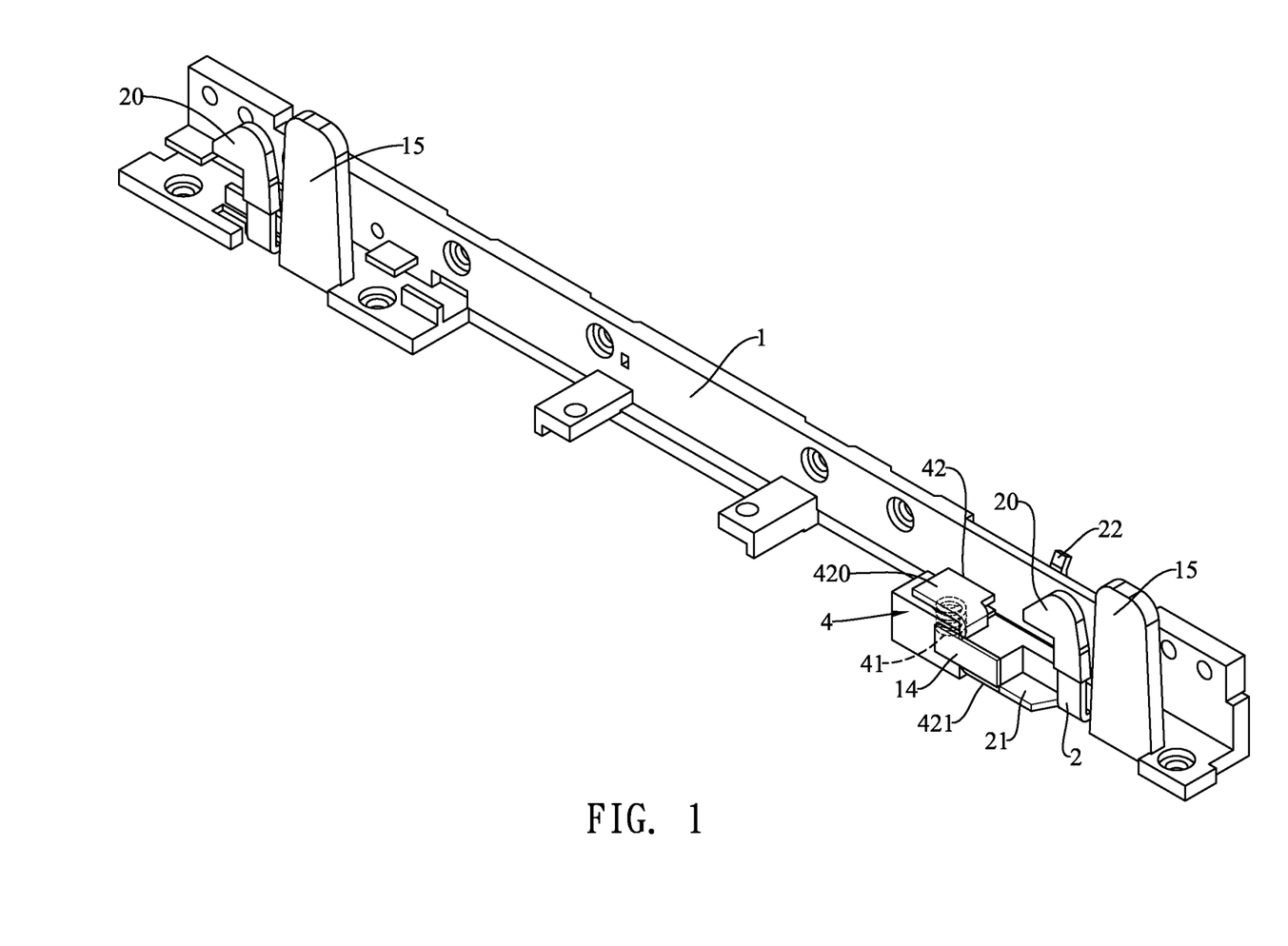
FIG. 1 is a perspective view illustrating the assembly of the insertion device having recovering mechanism according to a first embodiment of the present invention.
Figure 2:
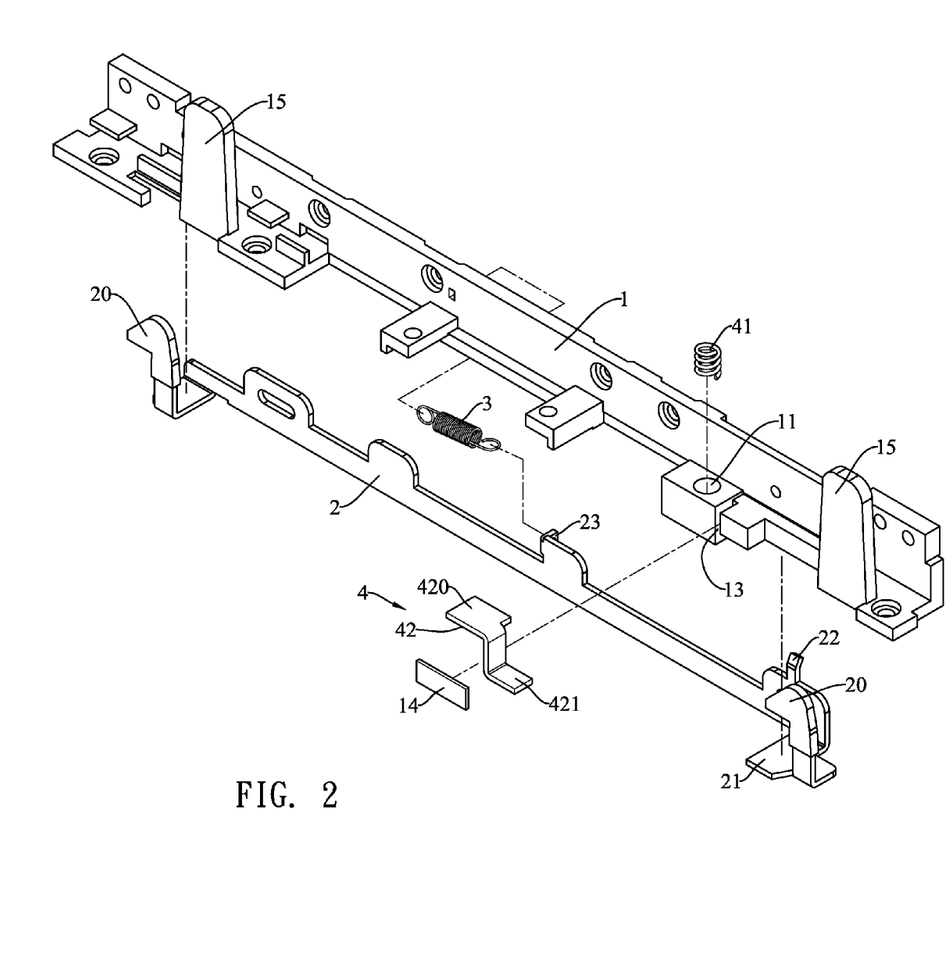
FIG. 2 is an exploded view illustrating the components of the insertion device having recovering mechanism according to the first embodiment of the present invention.
Figure 3:
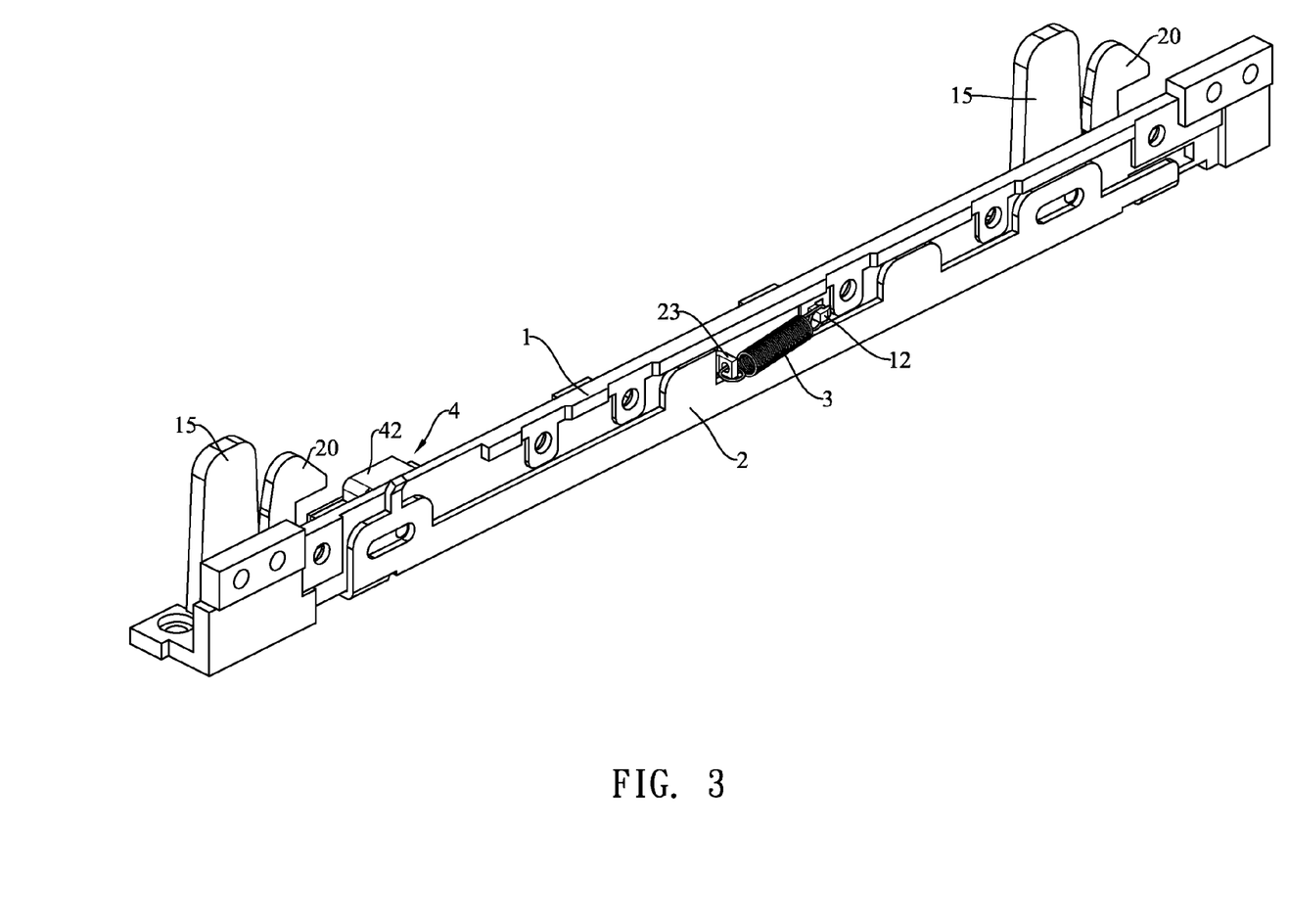
FIG. 3 is another perspective view illustrating the assembly of the insertion device having recovering mechanism being viewed from a different angle according to the first embodiment of the present invention.
Figure 4:
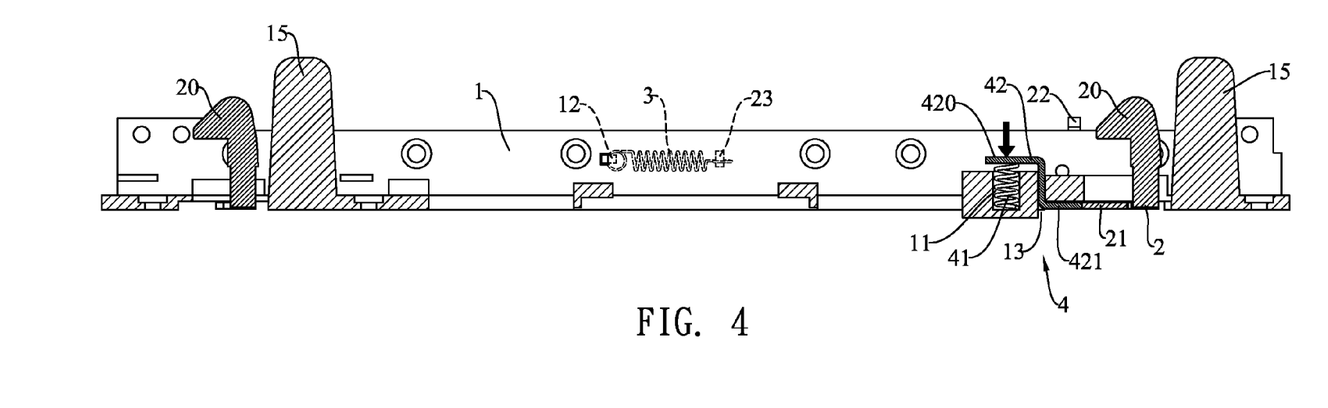
FIG. 4 is a cross sectional view illustrating a tablet computer not yet being connected with an expansion base according to the first embodiment of the present invention.

Referring from FIG. 1 to FIG. 4, wherein FIG. 1 is a perspective view illustrating the assembly of the insertion device having recovering mechanism according to a first embodiment of the present invention; FIG. 2 is an exploded view illustrating the components of the insertion device having recovering mechanism according to the first embodiment of the present invention; FIG. 3 is another perspective view illustrating the assembly of the insertion device having recovering mechanism being viewed from a different angle according to the first embodiment of the present invention; and FIG. 4 is a cross sectional view illustrating a tablet computer not yet being connected with an expansion base according to the first embodiment of the present invention. According to the first embodiment of the present invention, the insertion device having recovering mechanism comprises:

A support 1, fastened on an expansion base installed with a solid keyboard, and formed with a longitudinal accommodation hole 11.

A sliding rod 2, connected with the support 1, capable of being moved in parallel relative to the support 1, formed with two hook-shaped buckle parts 20, an abutting part 21 and a pushing rod 22, wherein the buckle parts 20 are enabled to be buckled in combination holes formed at the bottom of a tablet computer thereby allowing the tablet computer to be connected with the expansion base.

An elastic unit 3, formed as a tension spring, two ends thereof respectively fastened on a fasten part 12 of the support 1 and a fasten part 23 of the sliding rod 2.

A recovering mechanism 4, installed with a spring 41 accommodated in the accommodation hole 11, formed as a compress spring, wherein an actuation unit 42 is installed on top of the spring 41, the actuation unit 42 is integrally bent to a Z-like shape, and the top is formed with a press connection part 420 and the bottom is formed with a stop plate 421. The actuation unit 42 is moveably disposed in an installation slot 13 formed on the support 1, the actuation unit 42 is laterally installed in the installation slot 13, thereby allowing the press connection part 420 to be disposed above the spring 41 and the stop plate 421 to be disposed below the support 1. An outer side of the installation slot 13 is provided with a fasten plate 14 for limiting the actuation unit 42 in the installation slot 13. The spring 41 enables the actuation unit 42 to be upwardly/downwardly moved in the installation slot 13, thereby allowing the stop plate 421 to stop the abutting part 21 of the sliding rod 2 at a first position or be separated from the abutting part 21 at a second position for releasing the sliding rod 2.

Figure 5:
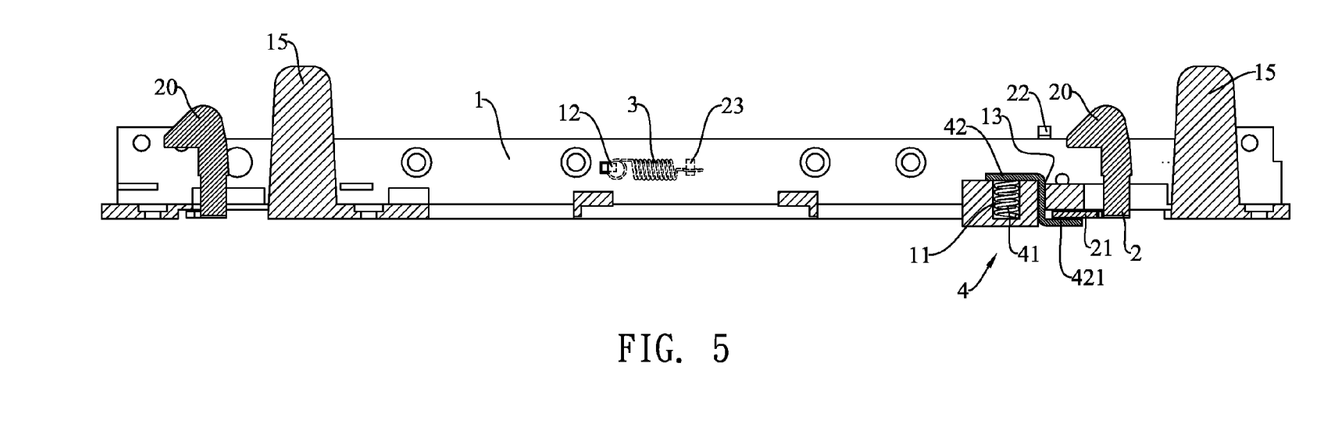
FIG. 5 is a cross sectional view illustrating the tablet computer being connected with the expansion base according to the first embodiment of the present invention.

Referring to FIG. 4, which is a cross sectional view illustrating a tablet computer not yet being connected with an expansion base according to the first embodiment of the present invention; at this moment, the spring 41 is in a released state, the actuation unit 42 is at the first position, the stop plate 421 formed at the bottom is served to stop the abutting part 21 of the sliding rod 2 thereby allowing the elastic unit 3 to be in a stretched state. Referring to FIG. 5, which is a cross sectional view illustrating the tablet computer being connected with the expansion base according to the first embodiment of the present invention; when the tablet computer is inserted in the expansion base, the bottom of the tablet computer downwardly presses the press connection part 420 of the actuation unit 42, thereby compressing the spring 41 in the accommodation hole 11, and the actuation unit 42 is downwardly moved to the second position, at this moment, the stop plate 421 of the actuation unit 42 is separated from the abutting part 21 of the sliding rod 2, thereby forming a movement space between the stop plate 421 and the bottom of the support 1, the sliding rod 2 is pulled by the recovering force provided by the elastic unit 3 thereby enabling the abutting part 21 to enter the movement space, and the buckle parts 20 are moved and buckled in the combination holes at the bottom of the tablet computer thereby forming a fastened state. The support 1 is additionally formed with two guide parts 15 for guiding the combination holes at the bottom of the tablet computer to be inserted on the support 1.

When the tablet computer is desired to be removed, the pushing rod 22 is rightwardly pushed, so the elastic unit 3 is stretched, the sliding rod 2 and the buckle parts 20 thereof are moved and separated from the buckle locations formed in the combination holes at the bottom of the tablet computer, thereby enabling the tablet computer to be upwardly removed. When the sliding rod 2 is moved for leaving the movement space, and the tablet computer is removed, the actuation unit 42 is recovered to the original first position through the spring 41, and the abutting part 21 of the sliding rod 2 is stopped by the stop plate 421, thereby allowing the sliding rod 2 and the buckle parts 20 to be recovered to the original positions, the tablet computer is then facilitated to be inserted again for being connected with the expansion base.

Figure 6:
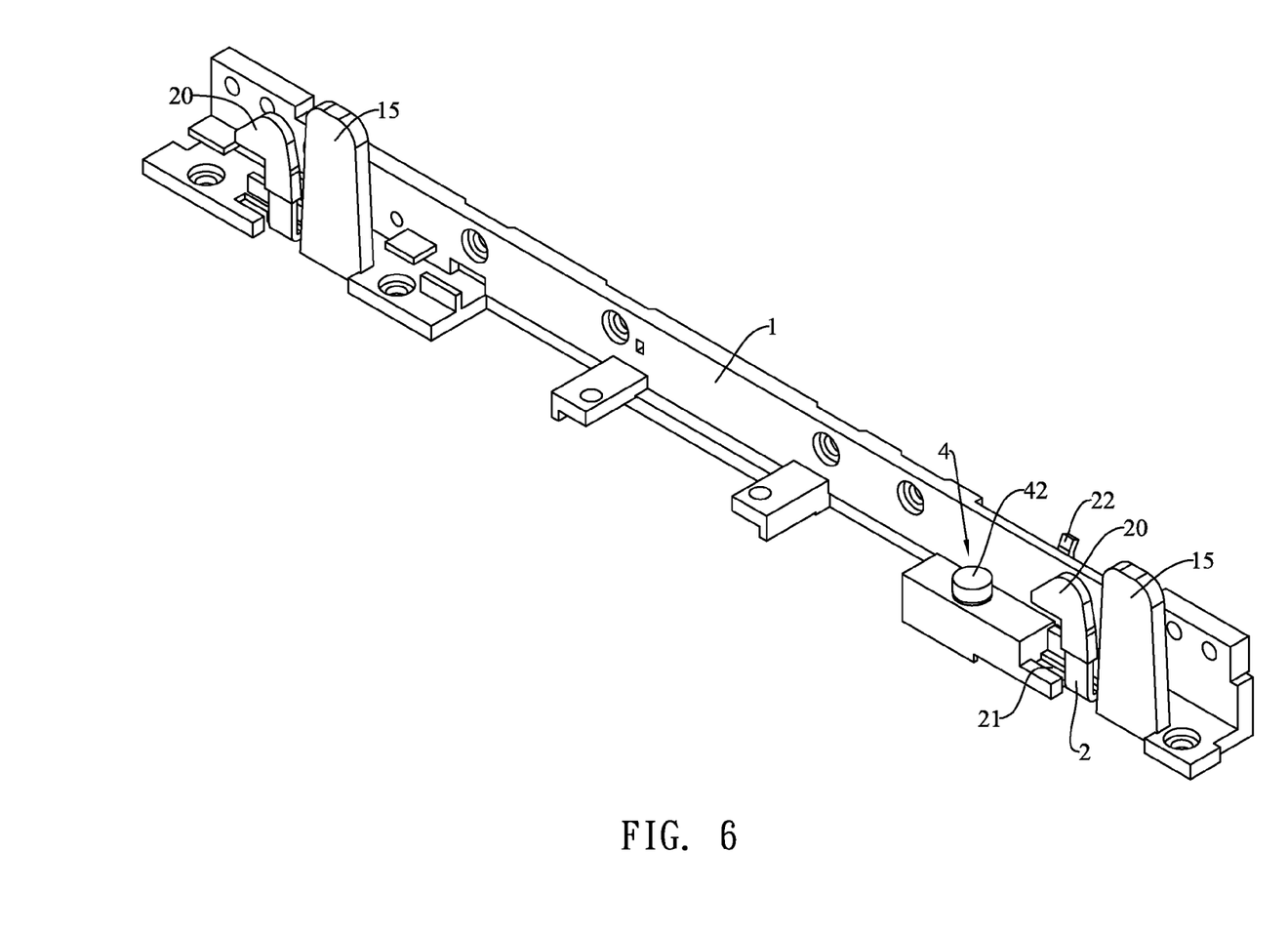
FIG. 6 is a perspective view illustrating the assembly of the insertion device having recovering mechanism according to a second embodiment of the present invention.
Figure 7:
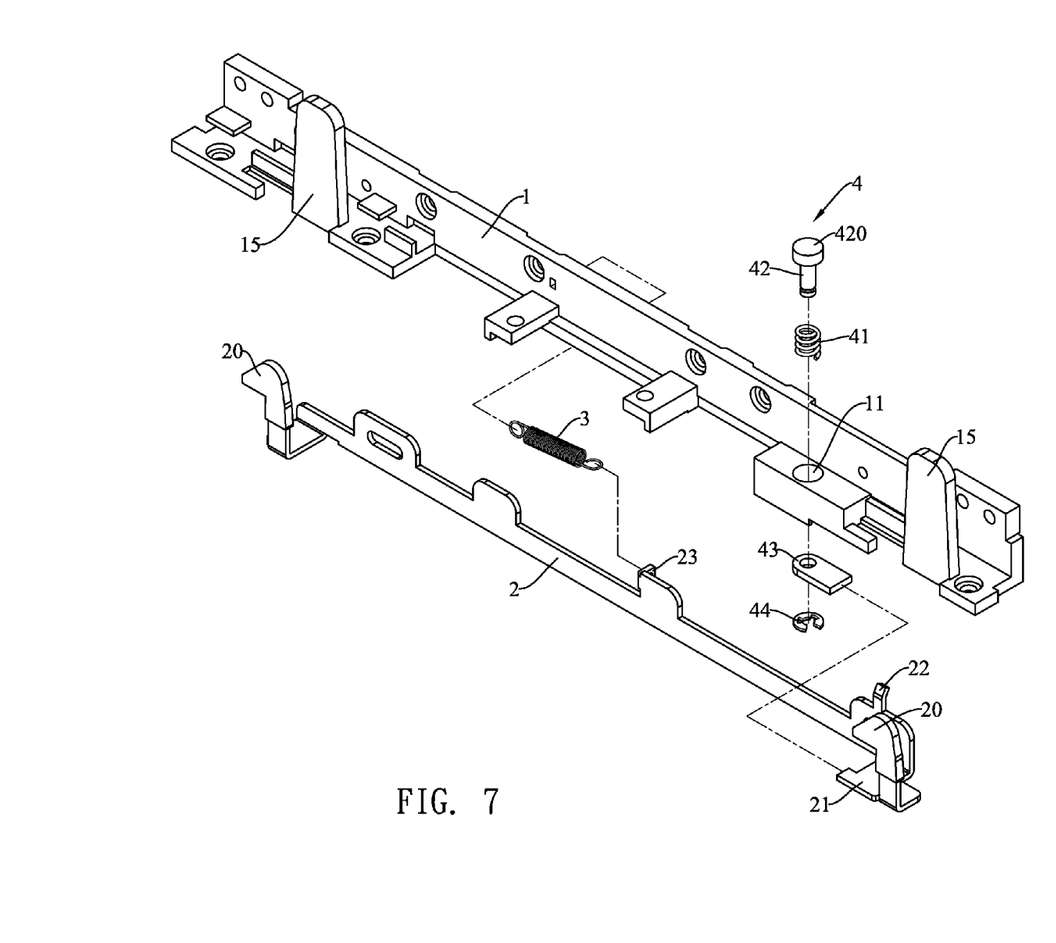
FIG. 7 is an exploded view illustrating the components of the insertion device having recovering mechanism according to the second embodiment of the present invention.
Figure 8:
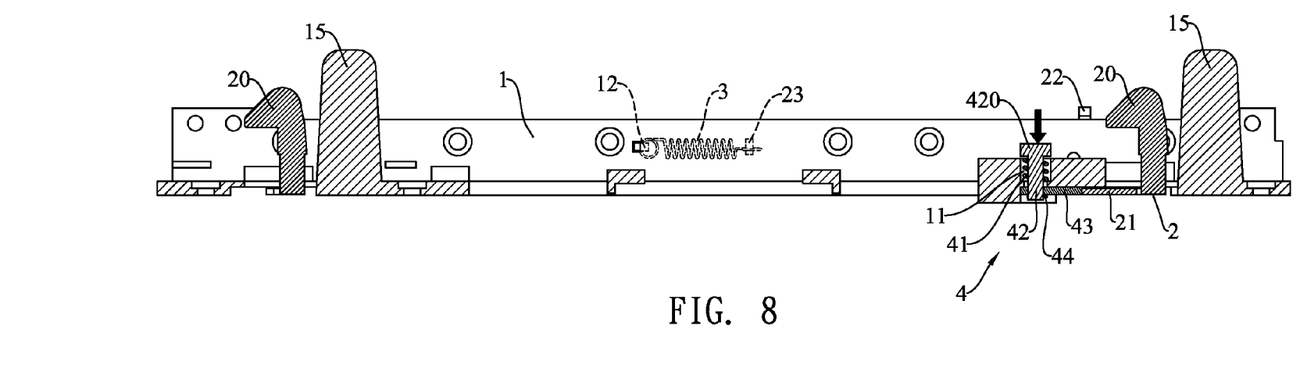
FIG. 8 is a cross sectional view illustrating a tablet computer not yet being connected with an expansion base according to the second embodiment of the present invention.

Referring from FIG. 6 to FIG. 8, wherein FIG. 6 is a perspective view illustrating the assembly of the insertion device having recovering mechanism according to a second embodiment of the present invention; FIG. 7 is an exploded view illustrating the components of the insertion device having recovering mechanism according to the second embodiment of the present invention; and FIG. 8 is a cross sectional view illustrating a tablet computer not yet being connected with an expansion base according to the second embodiment of the present invention. According to the second embodiment of the present invention, the insertion device having recovering mechanism comprises:

A support 1, fastened on an expansion base installed with a solid keyboard, and formed with a longitudinal accommodation hole 11.

A sliding rod 2, connected with the support 1, capable of being moved in parallel relative to the support 1, formed with two hook-shaped buckle parts 20, an abutting part 21 and a pushing rod 22, wherein the buckle parts 20 are enabled to be buckled in combination holes formed at the bottom of a tablet computer thereby allowing the tablet computer to be connected with the expansion base.

An elastic unit 3, formed as a tension spring, two ends thereof respectively fastened on a fasten part 12 of the support 1 and a fasten part 23 of the sliding rod 2.

A recovering mechanism 4, installed with a spring 41 accommodated in the accommodation hole 11, formed as a compress spring, wherein the spring 41 is sleeved on an actuation unit 42, the actuation unit 42 is received and penetrated the accommodation hole 11. The actuation unit 42 is formed as a press rod, the top thereof is formed with a press connection part 420 which presses the spring 41, the bottom thereof is penetrated the accommodation hole 11 and sleeved with a stop plate 43, the distal end thereof is sleeved with a buckle ring 44 thereby fastening the stop plate 43 and preventing the stop plate 43 from being loosened and/or detached. The spring 41 enables the stop plate 43 to be upwardly/downwardly moved for stopping the abutting part 21 of the sliding rod 2 at a first position or being separated from the abutting part 21 at a second position for releasing the sliding rod 2.

Referring to FIG. 8, which is a cross sectional view illustrating a tablet computer not yet being connected with an expansion base according to the second embodiment of the present invention; at this moment, the spring 41 is in a released state, the actuation unit 42 is at the first position, the stop plate 43 formed at the bottom is served to stop the abutting part 21 of the sliding rod 2 thereby allowing the elastic unit 3 to be in a stretched state.

Figure 9:
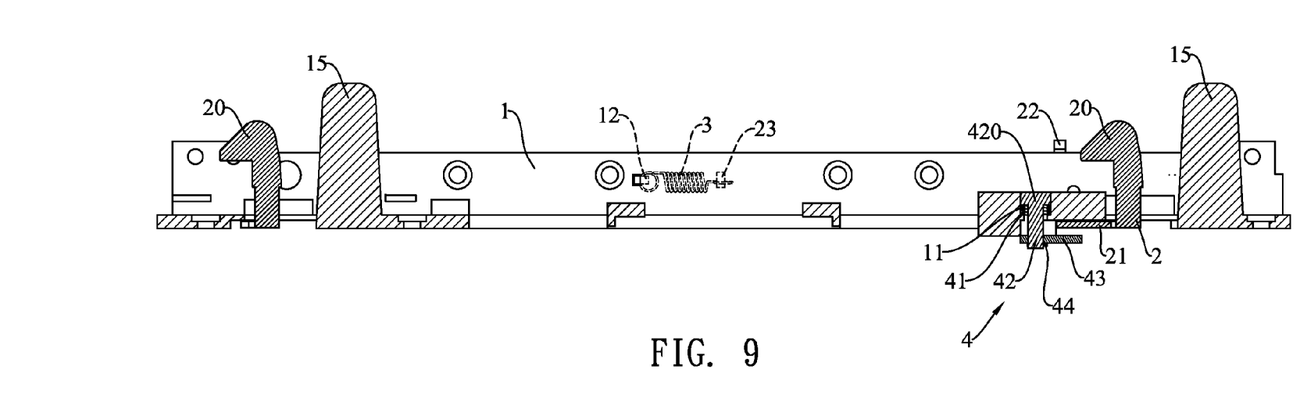
FIG. 9 is a cross sectional view illustrating the tablet computer being connected with the expansion base according to the second embodiment of the present invention.

As shown in FIG. 9, which is a cross sectional view illustrating the tablet computer being connected with the expansion base according to the second embodiment of the present invention; when the tablet computer is inserted in the expansion base, the bottom of the tablet computer downwardly presses the actuation unit 42, thereby enabling the press connection unit 420 to be downwardly moved and received in the accommodation hole 11 so as to compress the spring 41, and the actuation unit 42 is downwardly moved to the second position, at this moment, the stop plate 43 of the actuation unit 42 is separated from the abutting part 21 of the sliding rod 2, thereby forming a movement space between the stop plate 43 and the bottom of the support 1, and the sliding rod 2 is pulled by the recovering force provided by the elastic unit 3 thereby entering the movement space, and the buckle parts 20 are moved and buckled in the combination holes at the bottom of the tablet computer thereby forming a fastened state. The support 1 is additionally formed with two guide parts 15 for guiding the combination holes at the bottom of the tablet computer to be inserted on the support 1.

When the tablet computer is desired to be removed, the pushing rod 22 is rightwardly pushed, so the elastic unit 3 is stretched, the sliding rod 2 and the buckle parts 20 thereof are moved and separated from the buckle locations formed in the combination holes at the bottom of the tablet computer, thereby enabling the tablet computer to be upwardly removed. When the sliding rod 2 is moved for leaving the movement space, and the tablet computer is removed, the actuation unit 42 is recovered to the original first position through the spring 41, and the abutting part 21 of the sliding rod 2 is stopped by the stop plate 43, thereby allowing the sliding rod 2 and the buckle parts 20 to be recovered to the original positions, the tablet computer is then facilitated to be inserted again for being connected with the expansion base.

Figure 10:
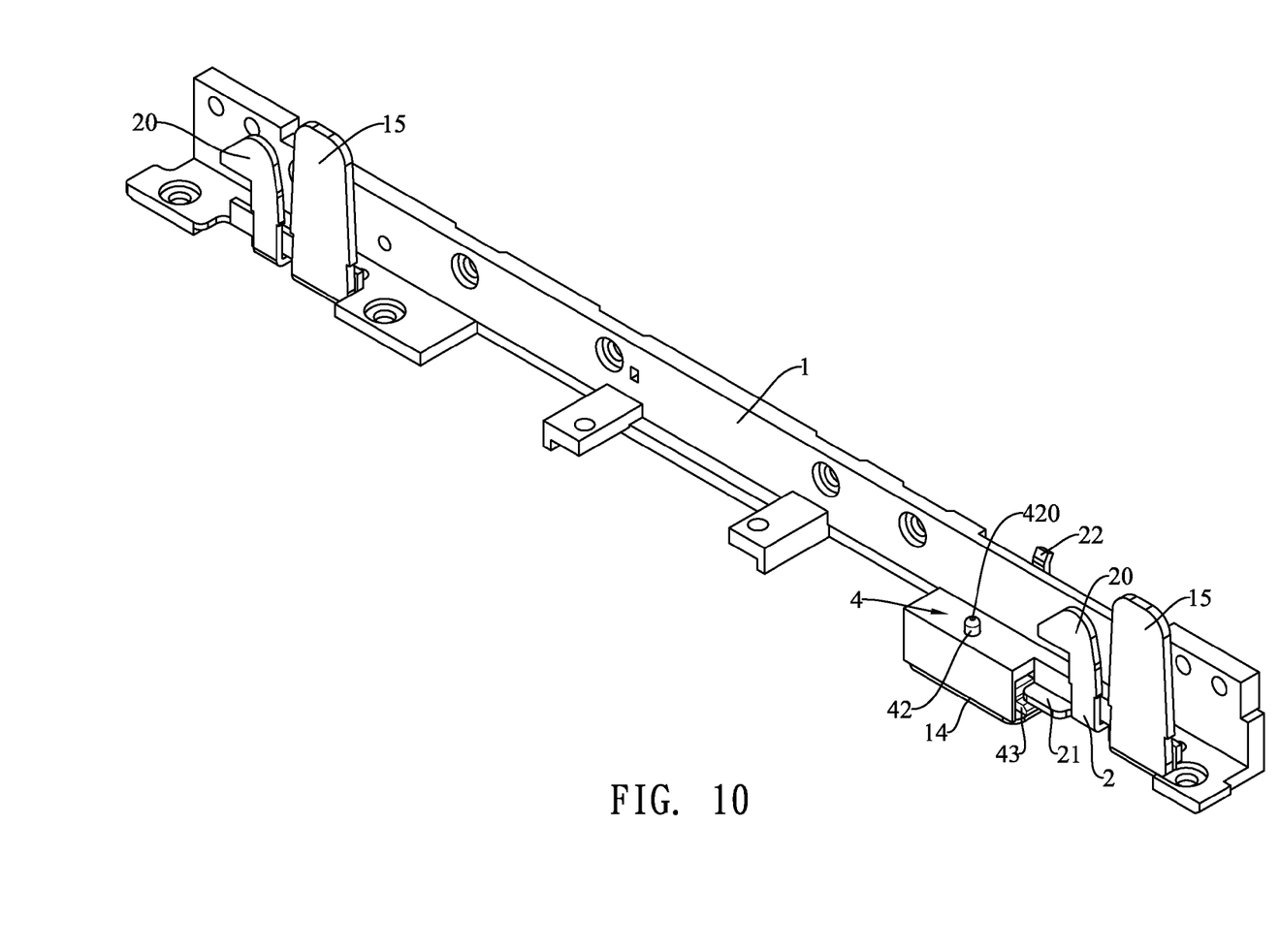
FIG. 10 is a perspective view illustrating the assembly of the insertion device having recovering mechanism according to a third embodiment of the present invention.
Figure 11:
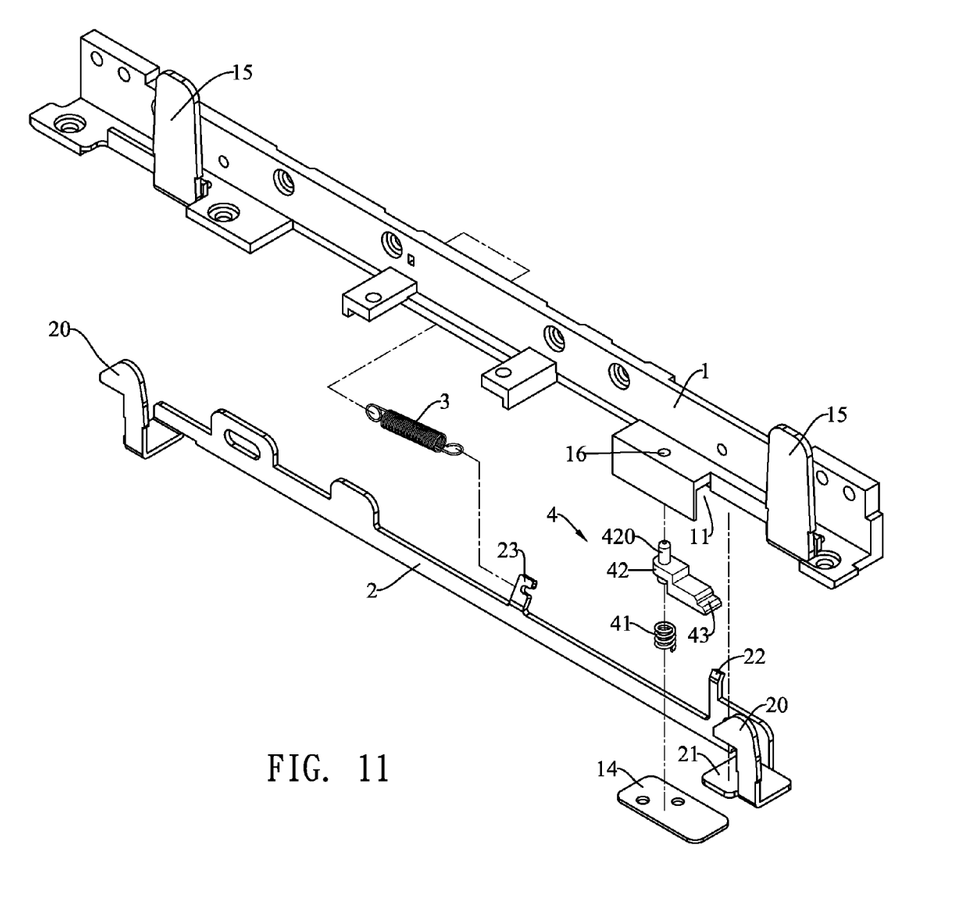
FIG. 11 is an exploded view illustrating the components of the insertion device having recovering mechanism according to the third embodiment of the present invention.
Figure 12:
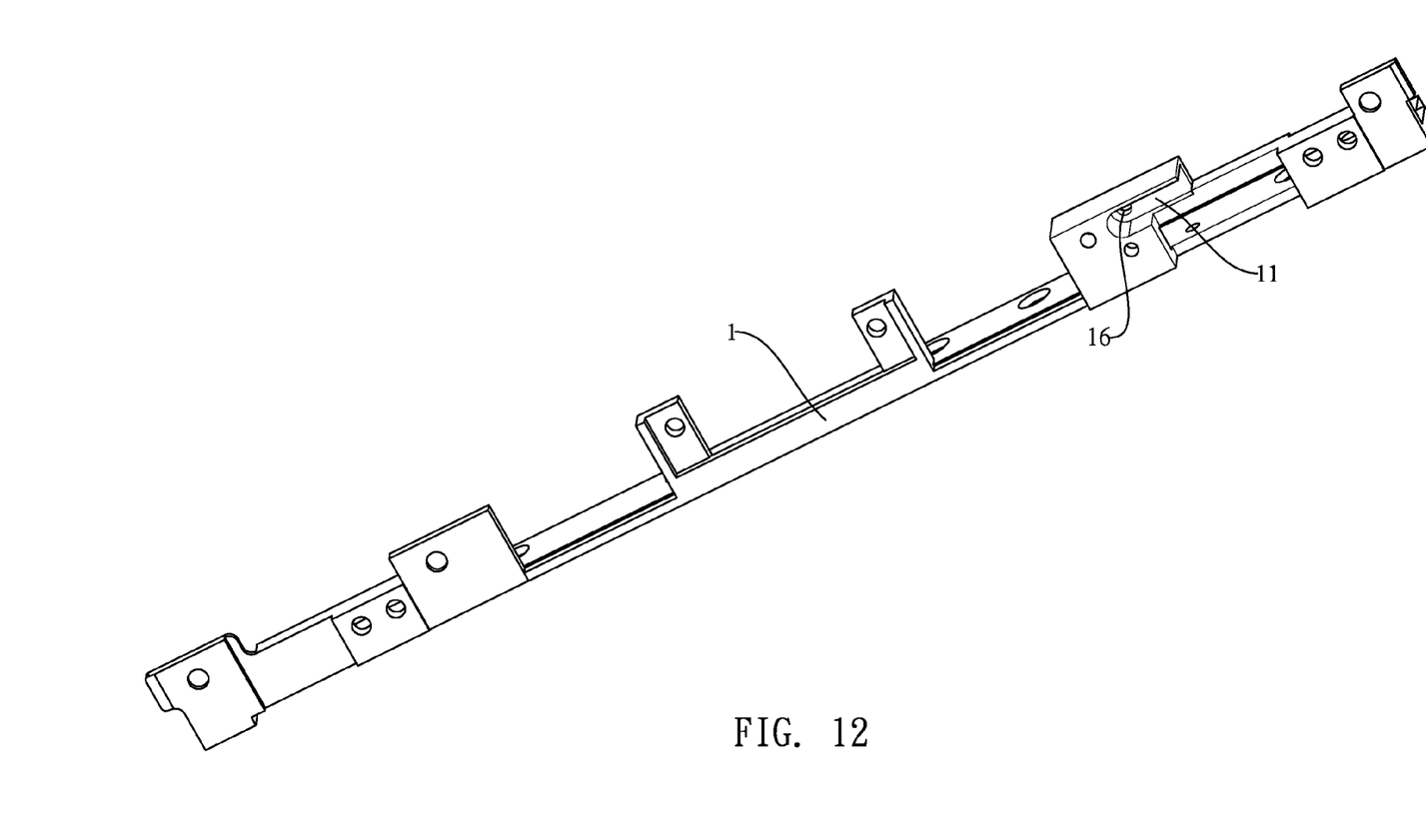
FIG. 12 is a schematic view illustrating the support being viewed from a different angle according to the third embodiment of the present invention.
Figure 13:
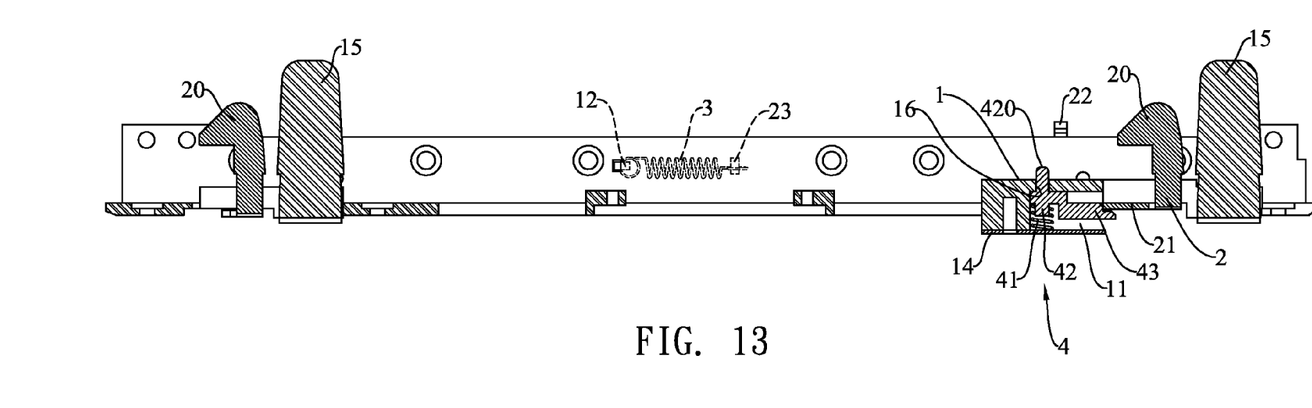
FIG. 13 is a cross sectional view illustrating a tablet computer not yet being connected with an expansion base according to the third embodiment of the present invention.
Figure 14:
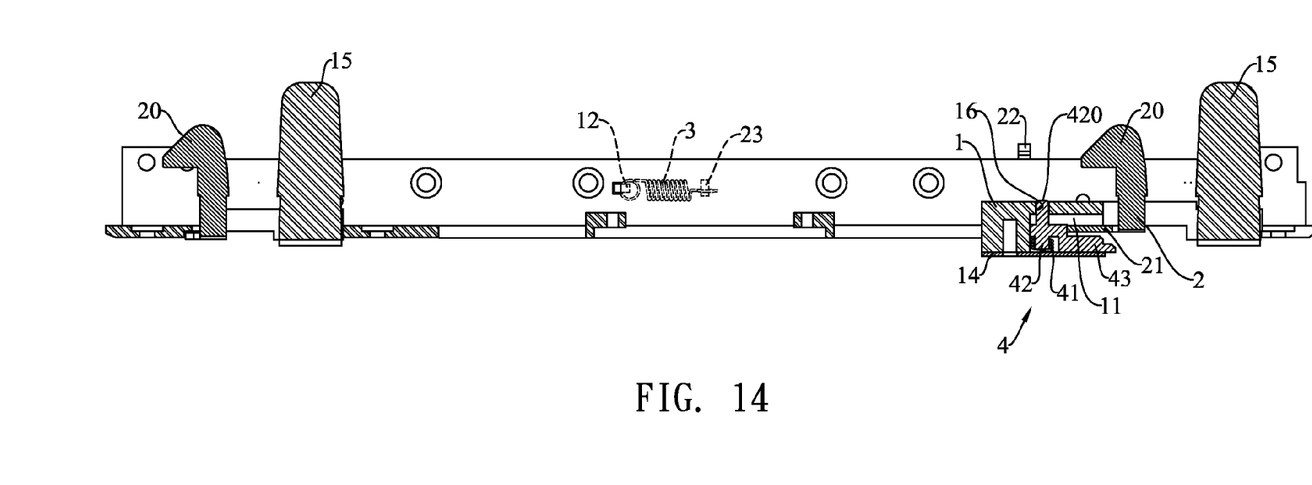
FIG. 14 is a cross sectional view illustrating the tablet computer being connected with the expansion base according to the third embodiment of the present invention.

Referring from FIG. 10 to FIG. 14, wherein FIG. 10 is a perspective view illustrating the assembly of the insertion device having recovering mechanism according to a third embodiment of the present invention; FIG. 11 is an exploded view illustrating the components of the insertion device having recovering mechanism according to the third embodiment of the present invention; FIG. 12 is a schematic view illustrating the support being viewed from a different angle according to the third embodiment of the present invention; FIG. 13 is a cross sectional view illustrating a tablet computer not yet being connected with an expansion base according to the third embodiment of the present invention; and FIG. 14 is a cross sectional view illustrating the tablet computer being connected with the expansion base according to the third embodiment of the present invention. According to the third embodiment of the present invention, the insertion device having recovering mechanism provided by the present invention comprises:

A support 1, fastened on an expansion base installed with a solid keyboard, the bottom of the support 1 is formed with an accommodation hole 11, the top of the accommodation hole 11 is formed with a through hole 16.

A sliding rod 2, connected with the support 1, capable of being moved in parallel relative to the support 1, formed with two hook-shaped buckle parts 20, an abutting part 21 and a pushing rod 22, wherein the buckle parts 20 are enabled to be buckled in combination holes formed at the bottom of a tablet computer thereby allowing the tablet computer to be connected with the expansion base.

An elastic unit 3, formed as a tension spring, two ends thereof respectively fastened on a fasten part 12 of the support 1 and a fasten part 23 of the sliding rod 2.

A recovering mechanism 4, installed with an actuation unit 42 accommodated in the accommodation hole 11, the actuation unit 42 is installed with a rod member, a press connection part 420 is formed on top of the rod member, the press connection part 420 is passed the through hole 16 of the support 1 and protrudingly disposed on the support 1. The middle of the rod member is installed with a stop plate 43, the bottom of the rod member is sleeved with a spring 41, and the spring 41 is formed as a compress spring. The spring 41 enables the stop plate 43 to be upwardly/downwardly moved for stopping the abutting part 21 of the sliding rod 2 at a first position or be separated from the abutting part 21 at a second position for releasing the sliding rod 2. The bottom of the accommodation hole 11 of the support 1 is installed with a fasten plate 14 thereby limiting the actuation unit 42 and the spring 41 in the accommodation hole 11. The lateral shape of the accommodation hole 11 is matched with the lateral shape of the stop plate 43 thereby forming a position limiting effect to the stop plate 43 and allowing the stop plate 43 to be smoothly and upwardly/downwardly moved in the accommodation hole 11. Accordingly, the lateral shape of the accommodation hole 11 can be the same as the lateral shape of the stop plate 43, thereby allowing the stop plate 43 to be smoothly and upwardly/downwardly moved along the lateral side of the accommodation hole 11.

Referring to FIG. 13, which is a cross sectional view illustrating a tablet computer not yet being connected with an expansion base according to the third embodiment of the present invention; at this moment, the spring 41 is in a released state, the actuation unit 42 is at the first position, the stop plate 43 formed at the bottom is served to stop the abutting part 21 of the sliding rod 2 thereby allowing the elastic unit 3 to be in a stretched state.

Referring to FIG. 14, when the tablet computer is inserted in the expansion base, the bottom of the tablet computer downwardly presses the actuation unit 42, thereby enabling the press connection unit 420 to be downwardly moved and received in the through hole 16 of the accommodation hole 11 so as to compress the spring 41, and the actuation unit 42 is downwardly moved to the second position, at this moment, the stop plate 43 of the actuation unit 42 is separated from the abutting part 21 of the sliding rod 2, thereby forming a movement space above the stop plate 43, and the sliding rod 2 is pulled by the recovering force provided by the elastic unit 3 thereby entering the movement space, and the buckle parts 20 are moved and buckled in the combination holes at the bottom of the tablet computer thereby forming a fastened state. The support 1 is additionally formed with two guide parts 15 for guiding the combination holes at the bottom of the tablet computer to be inserted on the support 1.

When the tablet computer is desired to be removed, the pushing rod 22 is rightwardly pushed, so the elastic unit 3 is stretched, the sliding rod 2 and the buckle parts 20 thereof are moved and separated from the buckle locations formed in the combination holes at the bottom of the tablet computer, thereby enabling the tablet computer to be upwardly removed. When the sliding rod 2 is moved for leaving the movement space, and the tablet computer is removed, the actuation unit 42 is recovered to the original first position through the spring 41, and the abutting part 21 of the sliding rod 2 is stopped by the stop plate 43, thereby allowing the sliding rod 2 and the buckle parts 20 to be recovered to the original positions, the tablet computer is then facilitated to be inserted again for being connected with the expansion base.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An insertion device having recovering mechanism, comprising:
   a support, formed with an accommodation hole;
   a sliding rod, formed with at least one buckle part, capable of being moved in parallel relative to said support;
   an elastic unit, two ends thereof respectively connected to said support and said sliding rod; and
   a recovering mechanism, installed with a spring accommodated in said accommodation hole, an actuation unit penetrated said accommodation hole, and the spring sleeved on said actuation unit, the top of said actuation unit being formed with a press connection part disposed above said spring, and said actuation unit being formed with a stop plate, said spring enabling said actuation unit to be moved thereby enabling said stop plate to stop said sliding rod at a first position or release said sliding rod at a second position;
   wherein said accommodation hole is formed at the bottom of said support, the top of said accommodation hole is formed with a through hole, said actuation unit is a rod member, the top of said rod member is formed as said press connection part, said press connection part is passed said through hole of said support and protrudingly disposed on said support, said stop plate is formed at the middle of said rod member, and said spring is sleeved at the bottom of said rod member.

2. The insertion device having recovering mechanism as claimed in claim 1, wherein said accommodation hole is longitudinally formed, said spring is a compress spring, said actuation unit is a rod member penetrated said accommodation hole, the bottom thereof is passed said accommodation hole and sleeved with said stop plate, said stop plate is disposed below said support, said sliding rod is formed with an abutting part; when being at said first position, said abutting part is stopped by said stop plate, when being at said second position, a movement space is formed between said stop plate and the bottom of said support, said abutting part is released thereby being allowed to enter said movement space.

3. The insertion device having recovering mechanism as claimed in claim 2, wherein said actuation unit is sleeved with a buckle ring below said stop plate.

4. The insertion device having recovering mechanism as claimed in claim 1, wherein the bottom of said accommodation hole is installed with a fasten plate.

5. The insertion device having recovering mechanism as claimed in claim 1, wherein the lateral shape of said accommodation hole is matched with the lateral shape of said stop plate thereby forming a position limiting effect to said stop plate.

* * * * *